May 19, 1959  V. POMPER  2,886,948
HYDRAULIC CONTROL SYSTEMS IN PARTICULAR FOR
OPERATING A TRACTOR ROCK SHAFT
Filed Aug. 2, 1955  3 Sheets-Sheet 1

INVENTOR
VICTOR POMPER
BY Bailey, Stephens and Huettig
ATTORNEY

VICTOR POMPER
INVENTOR

BY Bailey, Stephens and Huettig
ATTORNEYS

2,886,948

HYDRAULIC CONTROL SYSTEMS IN PARTICULAR FOR OPERATING A TRACTOR ROCK SHAFT

Victor Pomper, Paris, France, assignor to Societe Industrielle Generale de Mecanique Appliquee S.I.G.M.A., Paris, France, a French society Application August 2, 1955, Serial No. 525,901

Claims priority, application France August 28, 1954

2 Claims. (Cl. 60—52)

The present invention relates to hydraulic control systems, that is to say systems for controlling from a distance the position of a part in accordance with that of a control member (for instance a control lever), so that for every position of said control lever there is one position and a single one of the part to be controlled. The present invention is more especially concerned with such control systems for tractor rock shafts.

It is known to constitute such a control system by a hydraulic motor operated by a liquid under pressure supplied thereto by means of a main valve which is urged back into neutral position by resilient means, the displacements of said main valve being hydraulically controlled by a liquid under pressure, the feed of which is controlled by a manually actuated pilot valve, said pilot valve being operatively connected with the movable part of the hydraulic motor so that said pilot valve is automatically returned into neutral position in response to a predetermined displacement of said movable part of the hydraulic motor resulting from the operation of said pilot valve.

In known systems of this kind, the circuit from which power liquid is fed to the hydraulic motor and the circuit from which liquid is fed to the main valve in order to control its displacements are both high pressure liquids connected in parallel. In these conditions, it is very difficult to prevent leaks of liquid in the pilot valve and it is therefore practically impossible to have the hydraulic motor locked in any desired position thereof.

The object of the present invention is to provide a system of the above mentioned kind which is better adapted to meet the requirements of practice than those made up to the present time.

For this purpose, according to this invention, the hydraulic circuit controlled by the pilot valve for operating the main valve is distinct from the main hydraulic circuit for operating the hydraulic motor and is a low pressure circuit, whereas the main circuit is under high pressure. In these conditions, it is possible practically to prevent leakage along the cooperating elements of the pilot valve and the hydraulic motor remains locked in any position into which it has been brought.

A preferred embodiment of the present invention will be hereinafter described with reference to the accompanying drawings, given merely by way of example and in which.

Figure 1:
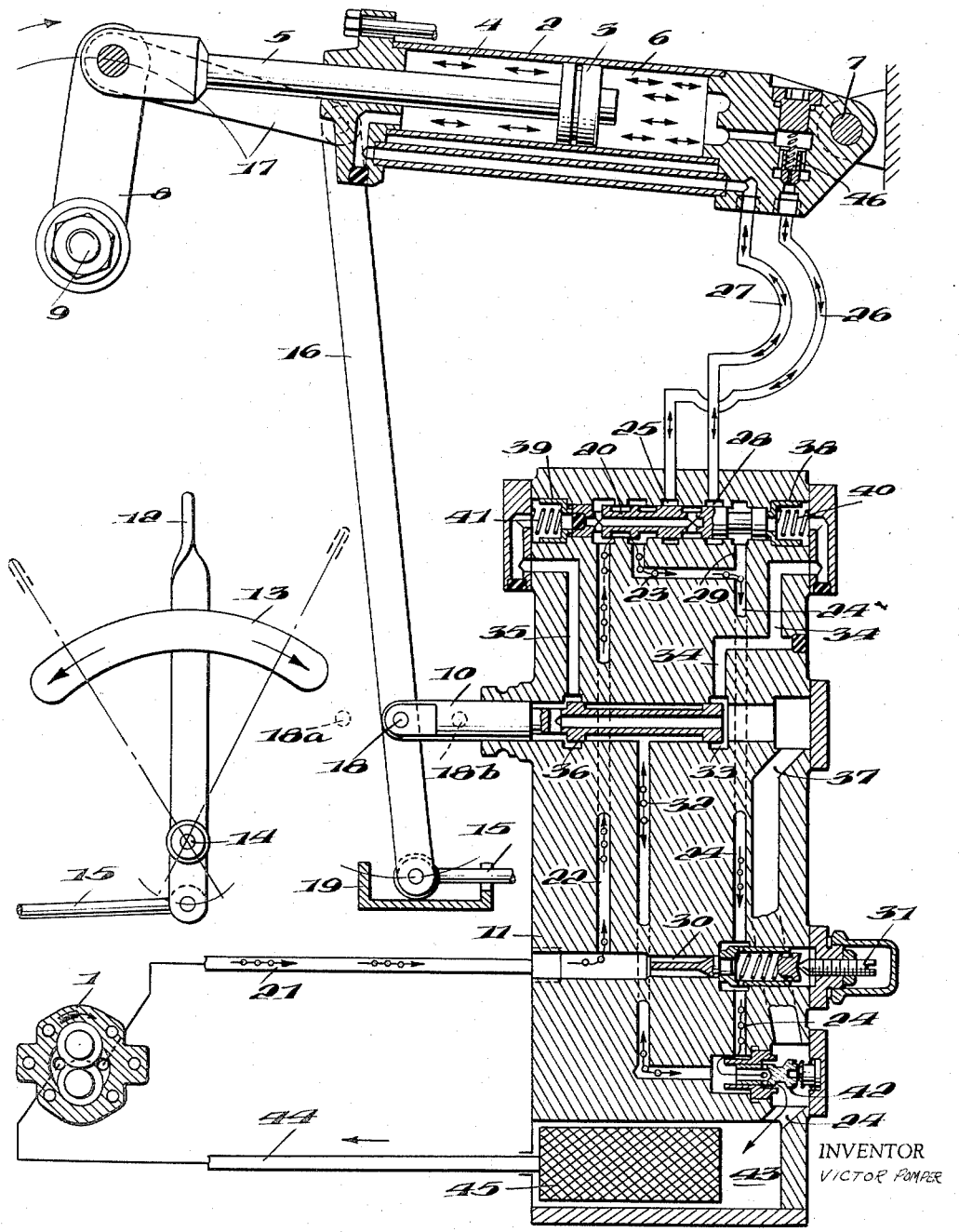
Fig. 1 is a diagrammatic sectional view of a hydraulic control system according to the present invention, the parts being in neutral position.

According to this embodiment, the system includes a pump 1, for instance a gear pump, constantly driven by a suitable motor and a hydraulic motor 2 the piston 3 of which divides the cylinder of said motor into two chambers, to wit, an annular chamber 4 through which passes the piston rod 5 and a cylindrical chamber 6. The cylinder of this hydraulic motor is pivoted at 7 on the frame of the tractor and its piston rod acts on a power lift device through a crank arm 8 fixed on a shaft 9. A valve 10, slidable in a casing 11, can be moved by means of a control lever 12 which can be displaced in a guide 13 about an axis 14. This control lever 12 acts upon valve 10 through a connecting rod 15 one end of which is pivoted to one end of lever 12 and the other end of which is pivotally connected with a lever 16 the other end of which is pivotally connected with a link 17 itself pivoted to piston rod 5. The end of slide valve 10 is pivotally connected at 18 to said lever 16. A fork-shaped member 19 cooperates with the lower end of connecting rod 15 to limit the displacements of control lever 12 between two end positions indicated in dotted lines on Fig. 1.

By means of this mechanism, including parts 12 to 18 inclusive, it is possible, by operating control lever 12, to move valve 10 on either side of a neutral position thereof (shown in solid lines on Fig. 1) into a desired position between two limits marked by the corresponding positions 18*a* and 18*b* of axis 18.

It will be readily understood that with such a mechanism, when lever 12 is brought into any desired position and thus closes the hydraulic motor 2 to be operated, the movement of the piston of this motor gradually returns valve 10 into its neutral position when shaft 9 has come into a given position corresponding to the position given to lever 12.

In control systems of the type with which the present invention is concerned, it is very difficult to obtain a sufficient sensitivity of the system because the pressure of the liquid in the circuit which is to supply the hydraulic motor is relatively high, for instance 90 kg. per sq. cm., and in this case, in order to avoid liquid leaks past the movable element of the control valve, in neutral position thereof, it is necessary to provide a considerable overlapping of the cooperating portions of said valve, which is of course contrary to the obtainment of a high sensitivity.

In order to obviate this drawback, according to the present invention, the main valve which controls the feed of liquid under pressure to hydraulic motor 2 is a valve 20 hydraulically operated by a circuit at relatively low pressure controlled by valve 10 which then constitutes merely a pilot valve. The main valve 20 is subjected to the action of resilient means which urge it toward its neutral position, as soon as the piloting action of valve 10 ceases, this position corresponding to chambers 4 and 6 of the hydraulic motor being out of communication with the circuit under high pressure.

Such a system according to the present invention therefore includes two hydraulic circuits: a piloting circuit at low pressure controlled by valve 10 and another circuit at high pressure controlled by the main valve 20.

Preferably, the pilot circuit is fed with liquid collected from the high pressure circuit downstream of the hydraulic motor and upstream of a loaded valve which ensures the desired low pressure.

Figure 2:
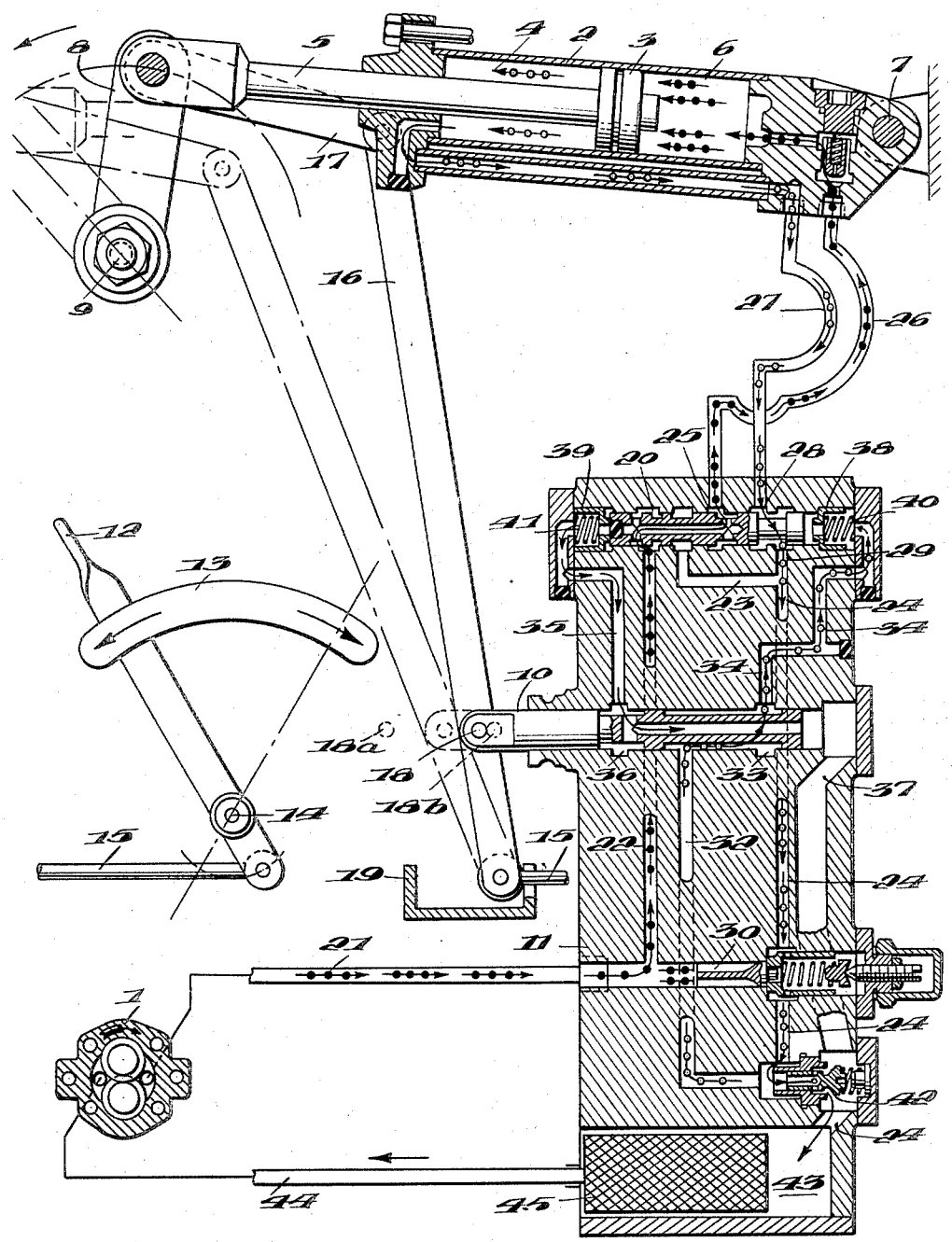
Figs. 2 and 3 are similar views of the same device corresponding to the operation thereof in two opposed directions.
Figure 3:
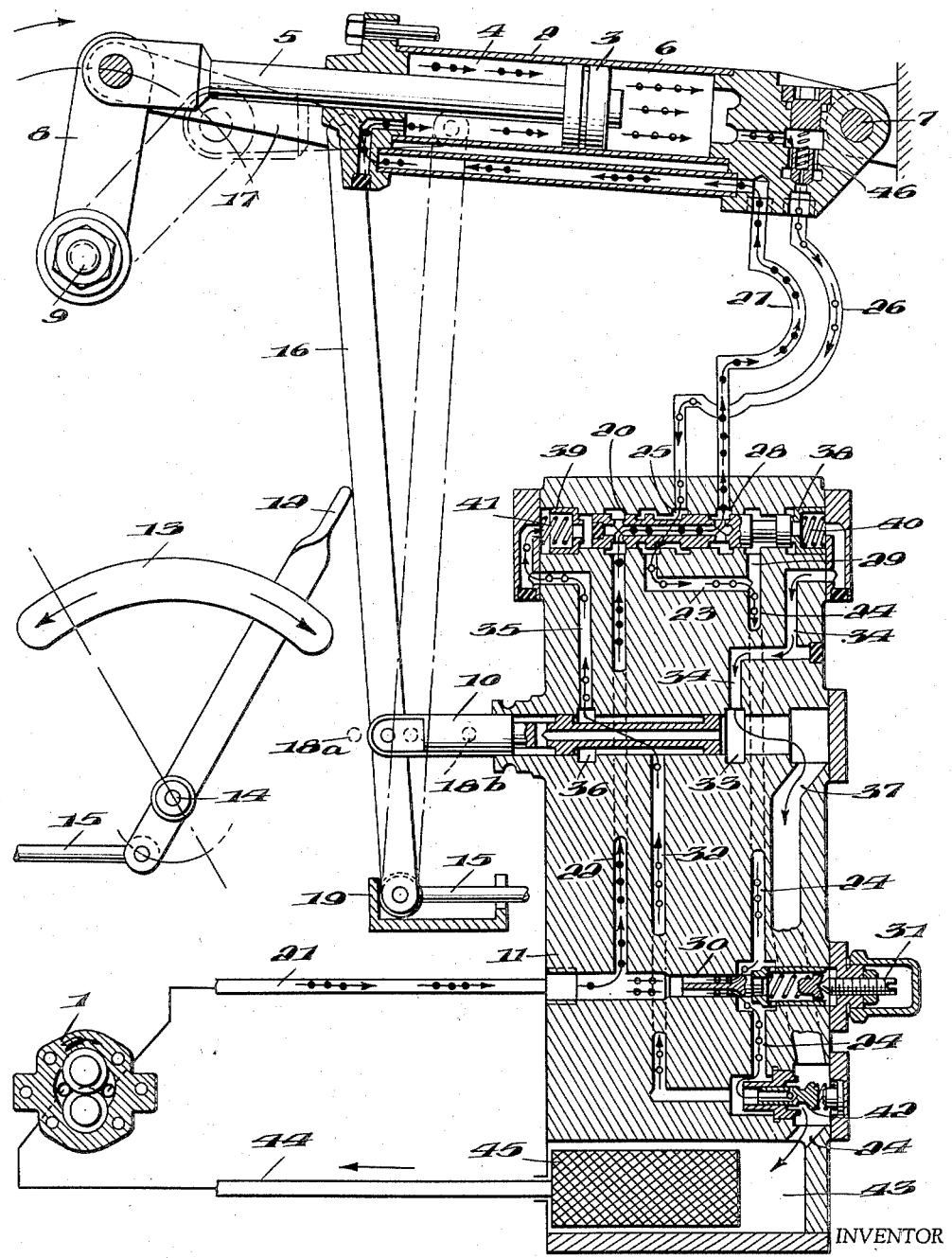

In the construction illustrated by the drawing, main valve 20 which receives liquid from pump 1 through conduits 21 and 22 is a four-way slide valve such that it can place high pressure feed conduit 22 in communication; either, when valve 20 is in neutral position (Fig. 1), with a conduit 23 leading to a low pressure conduit 24; or, when valve 20 is in the position of Fig. 2, with the cylindrical chamber 6 of the hydraulic motor through a groove 25 and a conduit 26, the annular chamber 4 of the hydraulic motor being then placed in communication, through a conduit 27, a groove 28 and a conduit 29, with the low pressure conduit 24; or, again, when valve 20 is in the position of Fig. 3, with the annular chamber 4 of the hydraulic motor through groove 28 and conduit 27, the cylindrical chamber 6 of the hydraulic motor being placed in communication, through conduit 26, groove 25 and conduit 23, with the low pressure conduit 24.

A safety valve 30, preferably of the gradually opening type and making use of slots provided in its plunger portion, is provided in the feed circuit from pump 1 upstream of valve 20, in order to limit the pressure in said circuit to a value of for instance 90 kgs. per sq. cm. When this safety valve opens, liquid is by-passed into the low pressure conduit 24. The pressure at which valve 30 operates may be adjusted by means of a screw 31 or the like.

The pilot valve 10 is a two-way slide valve which has a neutral position, illustrated by Fig. 1, where liquid present in a conduit 32 in communication with the low pressure conduit 24 cannot flow past said valve 10.

When valve 10 is moved toward the right, as shown by Fig. 2, it places this conduit 32 into communication through a groove 33, with a conduit 34 in communication with the one of the end faces of valve 20 (which is then hydraulically operated like a piston and cylinder hydraulic motor), whereas the space adjoining the other end face of valve 20 is connected, through a conduit 35, a groove 36 and a channel 37, with a reservoir 43 of liquid.

When the pilot valve 10 is moved in the other direction, that is to say toward the left, as shown by Fig. 3, it connects conduit 32, through groove 36, with conduit 35 which opens into the space adjoining said second mentioned end face of valve 20 which is then pushed toward the right, while connecting, through conduit 34, groove 33 and conduit 37, the other end face of valve 20 with reservoir 43.

Valve 20 is urged toward its neutral position, as shown by Fig. 1, by cup-shaped members 38 and 39 slidable in the axial direction of the valve and urged toward said valve by springs 40 and 41, respectively. Displacement of these members 38 and 39 toward each other is limited to the position that they occupy when valve 20 is in neutral position.

Conduit 32 branches off from the low pressure conduit 24 of the control circuit at a point located just upstream of a spring loaded valve 42 which is loaded at a pressure of for instance 3 kgs. per sq. cm.

Reservoir 43 to which liquid is fed back through conduit 37 and from the downstream end of valve 42 communicates, through a filter 45 and a conduit 44, with the intake of pump 1.

Advantageously there is provided, between chamber 6 of the hydraulic motor and the conduit 26 which connects said chamber with the main valve 20, a slowing down unidirectional valve 46 which permits liquid to flow freely toward chamber 6 but which slows down this flow in the opposed direction, as shown by Fig. 3.

On the drawings, the streams of liquid under high pressure (Figs. 2 and 3) are indicated by arrows provided with black dots. The streams of liquid under low pressure are indicated by arrows provided with white dots. The streams of liquid returning without pressure to reservoir 43 are shown by ordinary arrows. Finally arrows carrying dots which are partly white and partly black indicate the displacement of the liquid which is braked by valve 46 (Fig. 3).

The operation of this control system is as follows.

Fig. 1 shows the device in position of rest. Pump 1 is sucking in liquid such as oil through filter 45 and conduit 44. This liquid is discharged through conduits 21 and 22 to valve 20 which is in neutral position. This position of valve 20 is due to the fact that on the one hand it is subjected to the action of its springs 40 and 41 and that, on the other hand, since pilot valve 10 is in neutral position (control lever 12 being supposed to be in corresponding position), said valve 10 places the end chambers on either side of valve 20, where are located springs 40 and 41, in communication with reservoir 43, through conduits 34 and 37 on the one hand and conduit 35, grooves 36 and 33 and conduit 37 on the other hand.

Thus liquid (oil) from the pump which is fed through conduit 22 is returned, through conduits 23 and 24, toward valve 42 past which it flows to reservoir 43. Due to the adjustment of valve 42, the pressure in this circuit is 3 kgs. per sq. cm.

The low pressure or piloting pressure is transmitted through conduit 32 to the space in the housing of valve 10 so that any displacement of said valve on either side will make it possible to feed the piloting pressure to the desired side of main valve 20.

Fig. 2 corresponds for instance to an upward movement of an implement carried by rock shaft 9.

To obtain this displacement, the operator has moved control lever 12 toward the left, as shown by Fig. 2. As a result, the pilot valve 10 has been moved toward the right from its neutral position. As a consequence of this displacement of valve 10, oil under piloting pressure is fed through conduit 34 to the right hand side of valve 20, thus moving this valve toward the left and compressing spring 41. The oil in the chamber containing said spring 41 escapes to reservoir 43 through conduit 35, valve 10 and conduit 37. As soon as valve 20 is moved toward the left, the flow of oil to conduit 23 is cut off and valve 20 sends the oil fed from conduit 22 toward groove 25 and conduit 26. Due to the high resistance offered to the movement of the piston 3 of the hydraulic motor, the pressure raises the circuit, the incoming oil flows past valve 46 and enters the chamber 6 of the hydraulic motor. Piston 3 moves toward the left. The oil present in chamber 4 of the hydraulic motor escapes through conduit 27, groove 28, conduits 29 and 24 and returns to reservoir 43 past valve 42, which ensures the desired piloting pressure in the return circuit. In the course of this movement, the hydraulic motor returns pilot valve 10 to its neutral position. When valve 10 has reached this position, it again places the right hand side of valve 20 into communication with reservoir 43. Spring 41 is released and returns valve 20 to neutral position so that the pressure in the discharge circuit of pump 1 drops back to the piloting value and the oil present in the two chambers of the hydraulic motor is prevented from escaping.

It should be noted that, during the whole of this movement, valve 10 is hydraulically balanced and subjected exclusively to the low piloting pressure of the liquid, which is a very great advantage obtained owing to my invention. The maximum pressure in the apparatus is limited by safety valve 30.

If now the handle lever 12 is moved in the other direction, as illustrated by Fig. 3, pilot valve 10 is moved toward the left of its neutral position and sends oil under piloting pressure, through conduit 35, to the left hand side of valve 20 which is therefore moved toward the right against the action of spring 40 which is compressed. The oil on the right hand side of valve 20 escapes freely to reservoir 43 through conduit 34, groove 33 and conduit 37. As soon as valve 20 is moved toward the right, it sends oil from conduit 22 into groove 28 and conduit 27 and finally the annular chamber 4 of the hydraulic motor. The downward movement of the implement controlled by the system then takes place. The oil from chamber 6 passes through the calibrated orifice provided in valve 46 and thus brakes down this downward movement. As the surface of the piston on the side of chamber 4 is smaller than that of the other side of said piston and as the speed of the piston is supposed to be the same for this downward movement as during the upward movement, a portion of the oil is returned to reservoir 43 past safety valve 30, conduit 24 and past valve 42.

Oil driven out from the jack, after it has passed through the calibrated hole provided in valve 46, flows through conduit 26, the groove 25 of valve 20 and conduits 23 and 24 to valve 42 past which it flows to finally come into reservoir 43.

At the end of this movement, the hydraulic motor returns pilot valve 10 into neutral position. The left hand side of valve 20 is then connected with reservoir 43 through conduit 35, groove 36, the central hole of valve 10 and conduit 37. Spring 40 is no longer compressed and returns valve 20 into neutral position. The valves are again in the position shown by Fig. 1.

It should be noted that during all this last mentioned movement, pilot valve 10 is also hydraulically balanced and subjected only to the relatively low piloting pressure.

Control systems made according to the present invention have many advantages, and in particular the following ones.

The main valve 20 permits, owing to the fact that it can be given great displacements, of providing a substantial overlapping of the orifices (such as grooves 25 and 28) which lead to the cylinder of the hydraulic motor, so that leaks can be reduced to a minimum and the piston of said hydraulic motor can be caused to remain in any desired position while the pump supplies liquid to reservoir 43 at low pressure, therefore without heating said liquid.

Furthermore, the pilot valve 10 controlled by lever 12 is always subjected to low pressure, which reduces its resistance to movement and permits a smooth and easy operation of the apparatus.

Finally, the whole of this system is very simple to construct so that its cost is lower and the risks of breakdown are reduced.

Of course, such a system might be used to control several hydraulic motors instead of a single one.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A hydraulic control system which comprises, in combination, a hydraulic motor, a power liquid feed conduit leading to said motor, a liquid discharge conduit leading from said motor, a hydraulic circuit for supplying power liquid to said motor, a pump having its output connected with said circuit for constantly feeding liquid thereto, a low pressure hydraulic circuit, a main valve capable of opening or closing the communication between said first mentioned circuit and said feed conduit and simultaneously between said discharge conduit and said low pressure circuit, resilient means for urging said valve toward closed position, hydraulic motor means for opening said main valve, pilot conduit means leading to said last mentioned hydraulic motor means, a pressure regulating outlet valve in said low pressure hydraulic circuit for keeping under low pressure the liquid in said last mentioned hydraulic circuit, a pilot valve arranged to control the communication between said low pressure circuit and said pilot conduit means, means for manually operating said pilot valve, and means operative by said hydraulic motor for returning said pilot valve into closed position in response to a predetermined displacement of relatively moving parts of said hydraulic motor resulting from the manual operation of said pilot valve.

2. A hydraulic control system which comprises, in combination, a hydraulic motor including a cylinder and a piston slidable in said cylinder and dividing it into two chambers, one on each side of said piston, liquid conduit means leading to one of said chambers, liquid conduit means leading to the other of said chambers, a reservoir of liquid, a pump having its intake connected with said reservoir, a main conduit connected with the delivery end of said pump, a low pressure conduit, a resiliently loaded outlet valve connecting one end of said low pressure conduit with said reservoir to maintain a given low pressure in said last mentioned conduit, a main valve mounted between said conduits and said conduit means, said main valve being arranged, when in neutral position, to connect said main conduit with said low pressure conduit, when in one active position, to connect said main conduit with one of said conduit means and the other of said conduit means with said low pressure conduit, and, when in the other active position, to connect said main conduit with said last mentioned conduit means and the other of said conduit means with said low pressure conduit, resilient means for urging said main valve toward said neutral position thereof, hydraulic motor means for operating said main valve, said hydraulic motor means including two opposed piston and cylinder means operatively connected with said valve, two pilot conduits leading each to the variable volume chamber between one of said piston and cylinder means respectively, a pilot valve for controlling said last mentioned hydraulic motor means, said pilot valve having a neutral position in which it connects both of said pilot conduits with said reservoir, said pilot valve being movable on either side of said neutral position in such manner that, for positions of said pilot valve on one side of said neutral position, it connects one of said variable volume chambers with said low pressure conduit and the other variable volume chamber with said reservoir, and for displacements on the other side these last mentioned connections are inverted, means for manually operating said pilot valve and means operative by said hydraulic motor for returning said pilot valve into neutral position in response to a predetermined relative displacement of the piston and cylinder of said motor resulting from a corresponding manual displacement of said pilot valve.

References Cited in the file of this patent

UNITED STATES PATENTS

| | | |
|---|---|---|
| 2,047,922 | Seligmann | July 14, 1936 |
| 2,069,540 | Sanford | Feb. 2, 1937 |
| 2,477,710 | Worstell | Aug. 2, 1949 |

FOREIGN PATENTS

| | | |
|---|---|---|
| 410,728 | Great Britain | Aug. 16, 1932 |